United States Patent [19]
Saglio

[11] 3,913,386
[45] Oct. 21, 1975

[54] METHOD OF COMPENSATION FOR THE ANGLE OF REFRACTION OF AN ULTRASONIC BEAM AND A DEVICE FOR THE APPLICATION OF SAID METHOD

[75] Inventor: Robert Saglio, Massy, France

[73] Assignee: Commissariat a l'Energie Atomique, Paris, France

[22] Filed: Jan. 10, 1974

[21] Appl. No.: 432,308

[30] Foreign Application Priority Data
Jan. 16, 1973   France .................... 73.1465

[52] U.S. Cl. ..................... 73/67.5 R; 73/675.2
[51] Int. Cl.² .......................... G01N 29/00
[58] Field of Search ............ 73/67.5 R, 67.6, 67.7, 73/67.8 R

[56] References Cited
UNITED STATES PATENTS

| | | | |
|---|---|---|---|
| 3,074,268 | 1/1963 | Rafferty et al. | 73/67.5 R |
| 3,168,659 | 2/1965 | Bayre et al. | 73/67.5 R X |

*Primary Examiner*—Jerry W. Myracle
*Attorney, Agent, or Firm*—Cameron, Kerkam, Sutton, Stowell & Stowell

[57] ABSTRACT

The angle of refraction of an ultrasonic beam in a test-piece is compensated as a function of temperature by interposing a wedge consisting of at least two refractive media between the ultrasonic transducer and the test-piece. The velocity of propagation of the ultrasonic beam varies inversely as a function of temperature.

7 Claims, 7 Drawing Figures

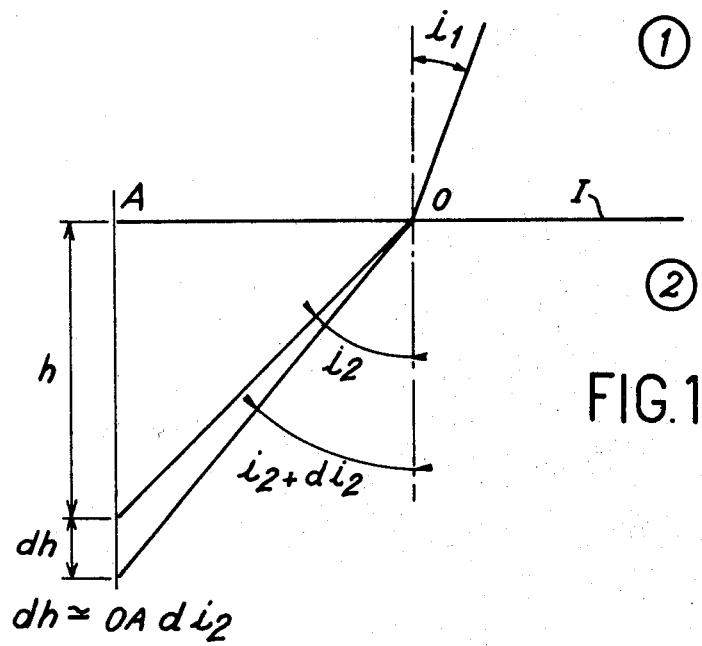
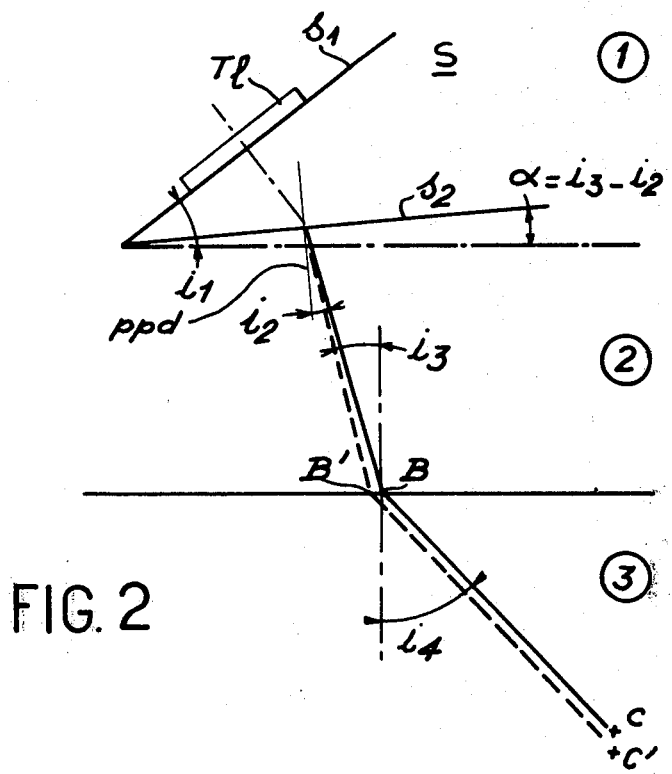
FIG. 1
FIG. 2

METHOD OF COMPENSATION FOR THE ANGLE OF REFRACTION OF AN ULTRASONIC BEAM AND A DEVICE FOR THE APPLICATION OF SAID METHOD

This invention relates to a method for improving the localization of flaws in ultrasonic testing of materials and especially in metallic welds.

It is known that the use of inclined transverse or longitudinal waves in ultrasonic testing entails a perfect knowledge of the angle of refraction, this condition being essential to good localization of faults. The angle of incidence and the angle of refraction are related by a law which utilizes the ratio of velocities between the two media in which the tests are carried out; in point of fact, this velocity ratio changes with temperature.

In fact, as shown in FIG. 1, in the case of a given angle of incidence (which is usually fixed), the sine of the angle of refraction is proportional to the ratio of velocities within the media 1 and 2.

Depending on whether the testing is performed by direct contact between the ultrasonic transducer and the material to be analyzed or by immersion, the medium 1 is either a viscoelastic material or water.

The medium 2 which constitutes the part to be inspected is usually metallic. The velocity of propagation of ultrasonic waves in metals is practically constant when the temperature varies between $-20°C$ to $+100°C$.

In both cases, the variation in velocity with temperature in the medium 1 is not negligible and introduces a variation in the angle of the refracted wave.

The invention proposes to correct the disturbances caused by temperature in the case of contact testing and immersion testing by means of ultrasonic vibrations.

More specifically, the invention relates to a method of compensation for the angle of refraction in ultrasonic transducers, wherein said method consists in interposing two refraction media in which the velocity of propagation of the ultrasonic beam varies inversely as a function of the temperature.

In one embodiment which utilizes the method according to the invention, a compensating device comprises a wedge interposed between the ultrasonic transducer and the test-piece and constituted by at least two media in which the velocity of propagation of the ultrasonic beam varies in inverse ratio.

In another embodiment, the compensating device comprises an immersion coupling between the transducer and the test-piece, a wedge constituted by at least one medium in which the velocity of the ultrasonic beam varies inversely with the immersion medium.

In the above-mentioned embodiments, one medium is water and the other medium is a viscoelastic substance which is employed for the wedge and is preferably selected from the group comprising Araldite, Specifix and Plexiglas.

The following specification relates to exemplified embodiments which are described with reference to the accompanying drawings, wherein:

FIG. 1 illustrates the optical diagram of variation in thickness localization of a flaw by means of an ultrasonic transducer;

FIG. 2 represents the optical diagram of a compensating device in accordance with the invention;

Figure 5:
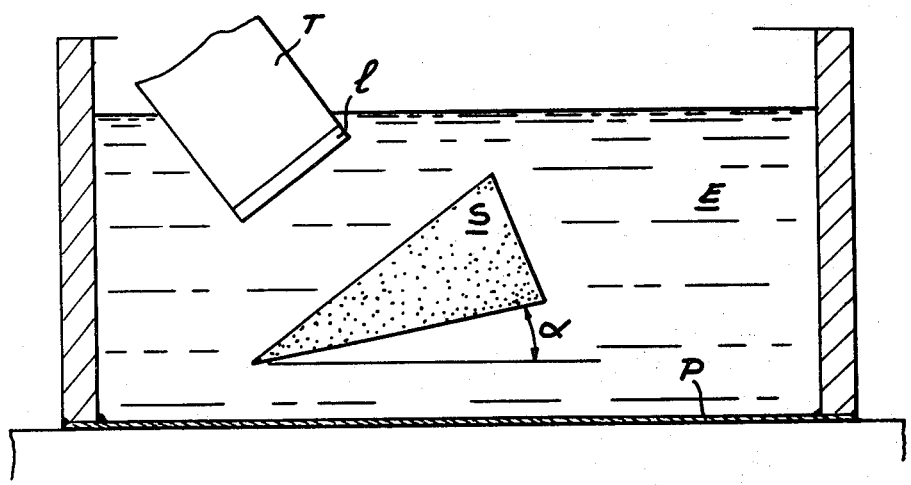
FIG. 5 is another alternative form of the compensating device.

It is apparent from FIG. 1 that, in the case of the interface I between two media, the angle of refraction is given by the relation:

$$\sin i_2 = \sin i_1 \cdot \frac{V_2}{V_1} \qquad (1)$$

For a given angle of incidence (usually fixed), the sine of the angle of refraction is proportional to the ratio of velocities within the media 1 and 2.

If the medium 1 consists of plastic material or of water and the medium 2 consists of a metallic substance, it is known that in both cases the variation in velocity with temperature is not negligible and this results in a variation in the angle of the refracted wave.

In FIG. 1, $dh$ corresponds to an increase in thickness localization of a flaw which is located at a distance $h$ from the interface I, $d_{i2}$ is the variation of angle as a function of the variation of temperature $\delta\theta$ which is obtained from relation (1):

$$\frac{\delta i_2}{\delta \theta} = - \frac{V_2}{V_1} \cdot \frac{\sin i_1}{\sqrt{V_1^2 - V_2^2 \sin^2 i_1}} \cdot \frac{\delta V_1}{\delta \theta} \qquad (2)$$

In the case of contact testing between the transducer and the test-piece, if the medium 1 is a viscoelastic material such as Araldite, Specifix or Plexiglas, the variation in velocity $$\frac{\delta V_1}{\delta \theta} \cong -4 \text{m/sec/°C}.$$

When employing an Araldite medium 1, it is found that $V_1$ decreases with the temperature and that $i_2$ increases when the temperature rises. By way of example as shown in FIG. 1 and in the case of a test carried out at 45° (medium 1 in Araldite), if the flaw is located at a depth of 200 mm between 20° and 40°C, the variation $dh$ of $h$ is equal to 6.3 mm.

In the case of immersion testing in which the medium 1 consists of water and the medium 2 consists of steel, it is found that $V_1$ increases with the temperature and that $i2$ decreases when the temperature rises. Thus in the case of a test performed at 45°, if the defect is located at a depth of 200 mm between 20° and 40°C, the variation $dh$ of $h$ is equal to 7 mm. These two examples lead to opposite conclusions; in fact, when the temperature rises, the velocity decreases in Araldite but increases in water.

The method according to the invention therefore consists in utilizing as couplant between the transducer and the test-piece at least two viscoelastic media in which the velocity of propagation varies inversely as a function of the temperature.

To this end, a preferred embodiment of the invention consists (as shown in FIG. 2) in disposing a wedge S of Araldite having a vertical angle $i_1$, with an entrance face $s_1$ which is parallel to the exit face $T_1$ of an ultrasonic transducer and the exit face $s_2$ being such as to form a water wedge having a vertical angel $\alpha$ with respect to the surface of the test-piece (medium 3).

Knowing that $i_1$ is constant, it is necessary to ensure that $i_4$ is equally constant and therefore that:

$$\frac{\delta i_2}{\delta \theta} = \frac{\delta i_3}{\delta \theta} \qquad (3)$$

By developing this equality, the following relations are obtained:

$$\frac{\delta i_2}{\delta \theta} = \frac{\sin i_1}{\cos i_2} \cdot \frac{1}{V_1} \cdot \frac{SV_2}{\delta \theta} - \frac{SV_1}{\delta \theta} \cdot \frac{V_2}{V_1} \qquad (3)$$

and $$\frac{\delta i_3}{\delta \theta} = \frac{\sin i_4}{\cos i_3} \cdot \frac{1}{V_3} \cdot \frac{SV_2}{\delta \theta} - \frac{SV_3}{\delta \theta} \cdot \frac{V_2}{V_3} \qquad (4)$$

which results in the need to combine $\sin i_4$ and in the general case $$\frac{\delta V_3}{\delta \theta} = 0$$

the following relation is obtained:

$$\frac{\sin^2 i_1}{V_1^2 - V_2^2 \sin^2 i_1} = \frac{1}{4} \cdot \frac{\sin^2 i_4}{V_3^2 - V_2^2 \sin^2 i^4} \qquad (5)$$

to this relation it must be added that:
$$\alpha = i_3 - i_2 \qquad (6)$$

By way of example, in the case of testing with transverse waves at 45° in steel, it is found that $i_1 = 15°10'$ and $\alpha = 8°25'$. FIG. 2 shows in dashed lines the effect of the correction made by the method according to the invention. The angle $i_4$ is maintained constant but there appears a slight displacement of the point B towards B'. If AB is small compared with BC, BB' is negligible and the same applies to CC'.

Figure 3:
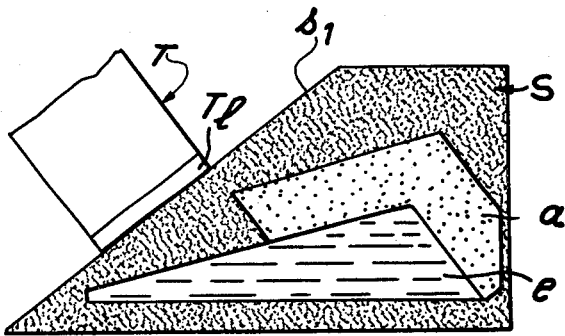
FIGS. 3 and 4 are alternative forms of the compensating device.
Figure 4:
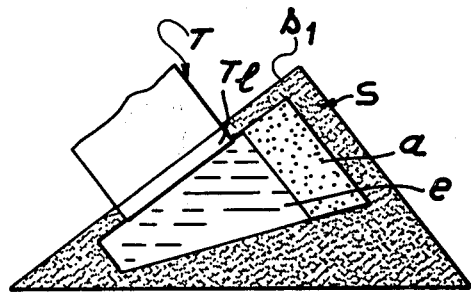

FIGS. 3 and 4 illustrate two exemplified embodiments of the invention in the case of compensated devices employed for ultrasonic contact testing. In these devices, the entrance face $s_1$ of the Araldite wedge S is parallel to the exit face $T_1$ of the transducer T whilst the exit face $s_2$ is parallel to that of the test-piece. The Araldite wedge S carries out an impedance matching operation between the piezoelectric transducer and the water lens $e$ which is incorporated in the Araldite wedge.

The medium $a$ is an absorbent substance which is necessary in order to minimize the importance of spurious reflections.

FIG. 5 shows a further example of a compensating device in accordance with the invention (see FIG. 2) which makes use of an ordinary transducer T and an Araldite wedge S. The entrance face $S_i$ of the wedge S is parallel to the exit face 1 of the transducer T and the exit face $s_2$ forms a water wedge having an angle $\alpha$ with respect to the test-piece P which is immersed in the water E.

Should it be desired to obtain a focused beam on the exit side of the wedge, one of the entrance or exit faces of said wedge can be curved in the shape of a convex or concave lens.

Figure 6:
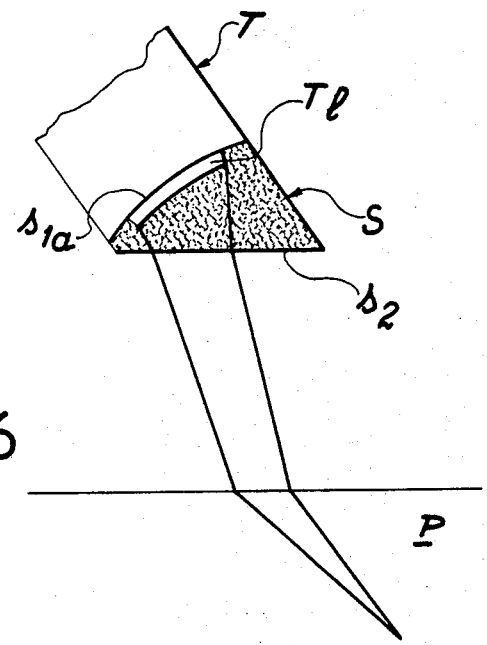
FIGS. 6 and 7 are optical focusing diagrams of the device according to the invention.
Figure 7:
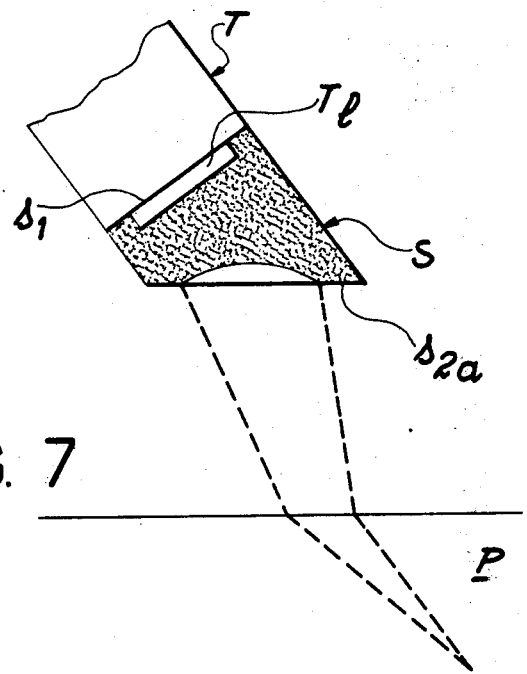

FIG. 6 illustrates a wedge S in accordance with the invention which is focused by means of an entrance face $S_{1a}$ in the shape of convex lens which is directed towards the transducer T. FIG. 7 shows another form of focusing of the wedge S through an exit face in the shape of a concave lens $s_{2a}$ which is directed towards the test-piece P.

It is readily apparent that the cases of focusing which are illustrated in FIGS. 6 and 7 apply to the embodiments which are given by way of example in FIGS. 3 to 5.

What we claim is:

1. A method of compensation for the angle of refraction of an ultrasonic beam in a test-piece as a function of temperature, wherein said method consists in interposing two refraction media between the ultrasonic transducer and the test-piece, the velocity of propagation of the ultrasonic beam in said media being such as to vary inversely as a function of temperature.

2. A device for compensation for the angle of refraction of an ultra-sonic beam in a test piece as a function of temperature comprising a wedge interposed between the ultra-sonic transducer and the test piece, said wedge being constituted by at least two media in which the velocity of propagation of the ultra-sonic beam varies in inverse ratio.

3. A device according to claim 2, wherein the wedge has flat faces.

4. A device according to claim 2, wherein the wedge has an entrance face in the shape of a convex lens which is directed towards the transducer.

5. A device according to claim 2, wherein the wedge has an exit face in the shape of a concave lens which is directed towards the test-piece.

6. A device according to claim 2 wherein said device comprises immersion coupling between the transducer and the test piece, said wedge being constituted by at least one medium in which the velocity of the ultrasonic beam varies inversely with the immersion medium.

7. A device according to claim 6 wherein one medium is water and the other medium is a viscoelastic substance Araldite, Specifix or Plexiglas which is employed for the wedge.

* * * * *